(12) United States Patent
Vignon et al.

(10) Patent No.: US 11,408,987 B2
(45) Date of Patent: Aug. 9, 2022

(54) ULTRASONIC IMAGING WITH MULTI-SCALE PROCESSING FOR GRATING LOBE SUPPRESSION

(71) Applicant: KONINKLIJKE PHILIPS N.V., Eindhoven (NL)

(72) Inventors: Francois Guy Gerard Marie Vignon, Andover, MA (US); Jun Seob Shin, Medford, MA (US); Seungsoo Kim, Andover, MA (US); David Hope Simpson, Bothell, WA (US); Andrew Hancock, Sacramento, CA (US)

(73) Assignee: PHILIPS IMAGE GUIDED THERAPY CORPORATION, San Diego, CA (US)

( * ) Notice: Subject to any disclaimer, the term of this patent is extended or adjusted under 35 U.S.C. 154(b) by 213 days.

(21) Appl. No.: 16/648,713

(22) PCT Filed: Aug. 30, 2018

(86) PCT No.: PCT/EP2018/073301
§ 371 (c)(1),
(2) Date: Mar. 19, 2020

(87) PCT Pub. No.: WO2019/057461
PCT Pub. Date: Mar. 28, 2019

(65) Prior Publication Data
US 2020/0217940 A1    Jul. 9, 2020

Related U.S. Application Data

(60) Provisional application No. 62/562,585, filed on Sep. 25, 2017.

(51) Int. Cl.
G01S 15/89    (2006.01)
G06T 7/00    (2017.01)
G01S 7/52    (2006.01)

(52) U.S. Cl.
CPC ...... G01S 7/52047 (2013.01); G01S 15/8952 (2013.01); G01S 15/8977 (2013.01);
(Continued)

(58) Field of Classification Search
CPC ............. G01S 7/52047; G01S 15/8952; G01S 15/8977; G06T 7/0012; G06T 2207/10132;
(Continued)

(56) References Cited

U.S. PATENT DOCUMENTS 5,833,613 A    11/1998    Averkiou
5,997,479 A    12/1999    Savord
(Continued)

FOREIGN PATENT DOCUMENTS

CN    104835130 A    8/2015
JP    2012196302 A  *  10/2012

OTHER PUBLICATIONS

Chen et al. "A Fast Filtering Algorithm for Image Enhancement." IEEE Transactions on Medical Imaging, vol. 13, No. 3, Sep. 1994, pp. 557-564 (Year: 1994).*
(Continued)

*Primary Examiner* — Jon Chang

(57) ABSTRACT

Aspects of the invention include ultrasound systems that suppress grating lobe artifacts arising due to high frequency operation of an array transducer probe which is operated at a frequency higher than its pitch limitation.

16 Claims, 3 Drawing Sheets

(52) U.S. Cl.
CPC .. *G06T 7/0012* (2013.01); *G06T 2207/10132* (2013.01); *G06T 2207/20024* (2013.01); *G06T 2207/20084* (2013.01); *G06T 2207/20182* (2013.01); *G06T 2207/30004* (2013.01)

(58) Field of Classification Search
CPC . G06T 2207/20024; G06T 2207/20084; G06T 2207/20182; G06T 2207/30004
See application file for complete search history.

(56) References Cited

U.S. PATENT DOCUMENTS

| | | | |
|---|---|---|---|
| 6,013,032 | A | 1/2000 | Savord |
| 6,623,432 | B2 | 9/2003 | Powers |
| 2005/0033165 | A1 | 2/2005 | Ustuner |
| 2008/0194958 | A1 | 8/2008 | Lee |
| 2009/0141957 | A1 | 6/2009 | Yen |
| 2010/0160783 | A1 | 6/2010 | Halmann |
| 2013/0085392 | A1 | 4/2013 | Shin |
| 2016/0350620 | A1* | 12/2016 | Rao .................. G06T 5/001 |
| 2017/0035394 | A1 | 2/2017 | Maeda |
| 2020/0200886 | A1* | 6/2020 | Vignon ................ G06T 5/20 |
| 2020/0214677 | A1* | 7/2020 | Shin .................. G10K 11/346 |

OTHER PUBLICATIONS

English Translation of JP2012196302A (Year: 2012).*
International Search Report & Written Opinion for PCT/EP2018/073301, dated Jan. 22, 2019.
Greenspan, Hayit et al "Image Enhancement by Nonlinear Extrapolation in Frequency Space", IEEE Transactions on Image Processing, vol. 9, No. 6, Jun. 2000.
Xueying, Li, et al "An Evident Sidelobe Control Method based on NSCT for Ship Target in SAR Images", Journal of Electronics (China), vol. 28, No. 4, Nov. 2011.

* cited by examiner

ULTRASONIC IMAGING WITH MULTI-SCALE PROCESSING FOR GRATING LOBE SUPPRESSION

RELATED APPLICATION

This application claims the benefit of and priority to U.S. Provisional No. 62/562,585, filed Sep. 25, 2017, which is incorporated by reference in its entirety.

TECHNICAL FIELD

This invention relates to ultrasonic diagnostic imaging systems and, in particular, to ultrasound systems with multi-scale processing for grating lobe artifact suppression.

BACKGROUND

Ultrasonic diagnostic imaging systems are designed to operate with different kinds of ultrasound probes or catheters designed for specific imaging procedures. For instance, obstetrical probes for deep abdominal scanning generally use relatively low frequency transducers, since low frequency ultrasound will penetrate deeper into the body before depth-dependent attenuation of higher frequencies renders the images unsuitable for diagnosis. But when penetration depth is not a significant consideration, as in superficial imaging of shallower anatomy, high frequency transducers are generally preferred, as higher frequency echo signals will result in better image resolution of anatomy in finer detail. The same is true for intravascular catheters with ultrasound transducers, including annular and matrix arrays. The pitch (center to center spacing) and kerf (gap between adjacent elements) of the elements of an array transducer govern its high frequency performance, as the pitch and kerf determine the antenna pattern, the pattern of grating lobes, that the transducer will exhibit at different frequencies of operation. At lower frequencies a transducer array will exhibit the desired grating lobe pattern of a significant main lobe and much lower side lobes. But when the frequency of operation is increased such that the wavelengths of the ultrasonic frequencies become smaller than twice the pitch of the array elements, the grating will increase, thereby increasing the response of the transducer to off-axis (away from the main lobe) echo signals. The energy encompassed by the grating lobes will contribute to the desired energy received from the beam direction of the main lobe, introducing unwanted signal content to the desired echo signals. This grating lobe energy will produce artifacts giving the image a hazy appearance as the array signal content is now undersampled. As indicated above, this hazy appearance due to the increased side lobes can be eliminated by operating the transducer at lower frequencies, but this has the unfortunate result of decreasing image resolution.

SUMMARY

Accordingly, it is desirable to be able to operate such ultrasound arrays, whether for ultrasound probes or for ultrasound catheters, at higher frequencies while suppressing the artifacts due to the unwanted side lobes of the grating lobe pattern.

In accordance with the principles of the present invention an ultrasound system is described which suppresses grating lobe artifacts arising due to high frequency operation of an array transducer which is operated at a frequency higher than its pitch limitation. The array transducer may be included in an ultrasound probe or an ultrasound catheter. Echo signals at a high imaging frequency are acquired for a first image, which exhibits relatively high resolution but contains grating lobe artifacts. Echo signals for a second image are acquired at a low imaging frequency, which exhibits relatively low resolution, but is free of grating lobe artifacts. A multi-scale decomposition of both images is performed, and a final image is reconstructed based on the low spatial frequency content of the low resolution, grating lobe-free image and the high frequency content of the high resolution image. Because the grating lobe artifacts mainly appear as low spatial frequency objects, they will be largely suppressed in the reconstructed image.

DETAILED DESCRIPTION

Figure 1:
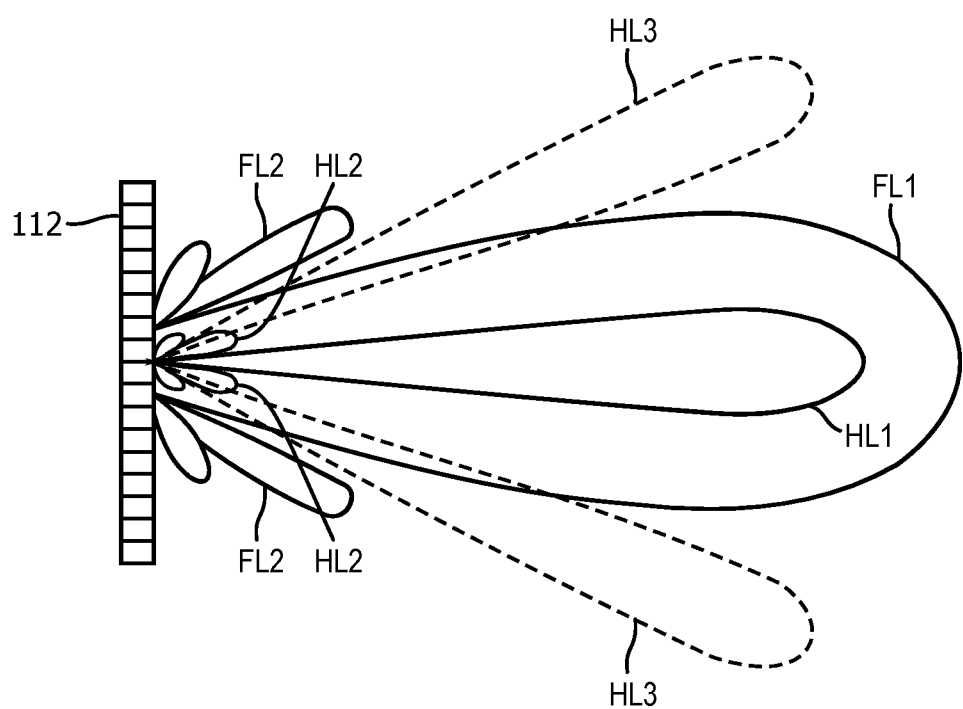
FIG. 1 is an antenna pattern of an ultrasound transducer array illustrating both high frequency and low frequency grating lobe patterns.

FIG. 1 is a diagram illustrating the overlay of the grating lobe patterns of an ultrasound transducer array 112 when operated at high and low frequencies. When the transducer array is operated at high frequencies but within the pitch limitation of the array, the diffraction pattern will exhibit a central main lobe HL1 and smaller side lobes HL2. The beam direction is generally aligned with the center axis of the main lobe HL1 and its narrow profile desirably encompasses energy returned from along the beam direction while rolling off energy returning from beyond the profile of HL1. The side lobes HL2 are much smaller than the main lobe, contributing little in the way of undesired off-axis energy returns. When the transducer is operated at lower frequencies, the a diffraction pattern of the array exhibits a wider main lobe FL1 (the vertical direction in FIG. 1), returning more energy on either side of the scanning beam along the center of main lobe FL1. This is largely why lower frequency ultrasound images have poorer resolution than do higher frequency images. There is still a significant difference in size between the main lobe FL1 and the side lobes FL2 which means that there will be little off-axis energy contribution to the desired main lobe response.

Now suppose that the array transducer is operated at a high frequency with a wavelength smaller than twice the pitch of the elements of array 112. Now grating lobes HL3 appear on the sides of the main lobe HL1, and may become comparable in amplitude to HL1. These grating lobes will increase energy from off-axis echoes into that received from along the main lobe HL1, resulting in the appearance of grating lobe artifacts in the resulting image.

Figure 2:
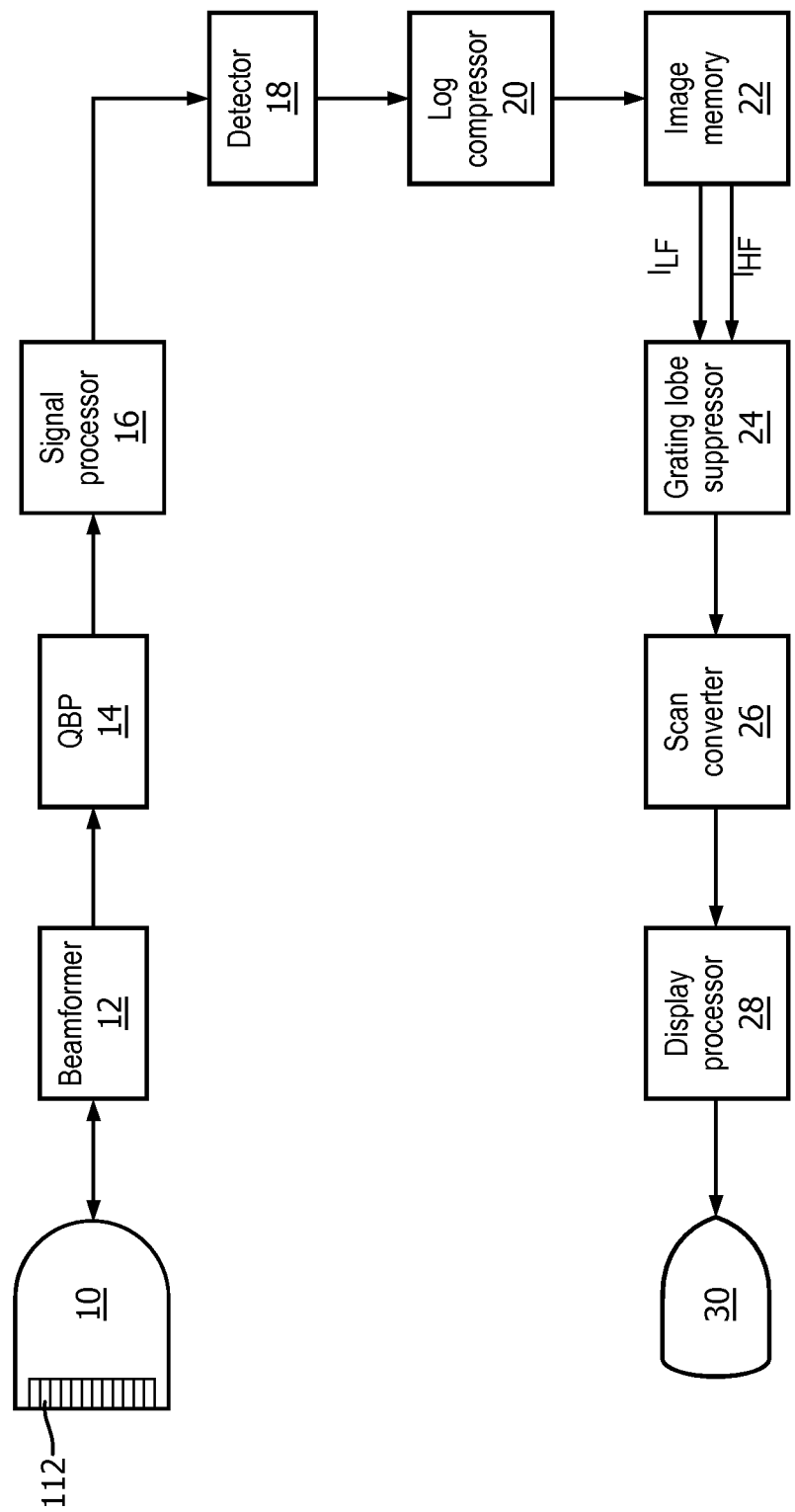
FIG. 2 illustrates in block diagram form an ultrasound system constructed in accordance with the principles of the present invention.

Referring now to FIG. 2, an ultrasonic diagnostic imaging system constructed in accordance with the principles of the present invention is shown in block diagram form. A transducer array 112 is provided in an ultrasound probe 10 for transmitting ultrasonic waves and receiving ultrasonic echo information. While an ultrasound probe is shown in the images, it is understood that principles of the invention are applicable to both external ultrasound and intravascular ultrasound. The transducer array 112 may be a one- or two-dimensional array of transducer elements capable of scanning in two or three dimensions, for instance, in both elevation (in 3D) and azimuth. In some instances, the transducer array is an annular array included in a distal portion of a catheter. A two-dimensional array will include a microbeamformer coupled to the array elements which controls transmission and reception of signals by the array elements. Microbeamformers are capable of at least partial beamforming of the signals received by groups or "patches" of transducer elements as described in U.S. Pat. No. 5,997, 479 (Savord et al.), U.S. Pat. No. 6,013,032 (Savord), and U.S. Pat. No. 6,623,432 (Powers et al.) The microbeamformer or the transducer elements are coupled by a cabling to a beamformer 12. The transmission of ultrasonic beams from the transducer array 12 under control of the microbeamformer 14 when so equipped, or directly if there is no microbeamformer, is directed by a transmitter in the beamformer, which receives input from the user's operation of a user interface or control panel of the ultrasound system (not shown). Among the transmit characteristics controlled by the transmitter are the frequency, amplitude, phase, and polarity of transmit waveforms. Beams formed in the direction of pulse transmission may be steered straight ahead from (orthogonal to) the transducer array, or at different angles to scan a wider field of view.

The echoes received by a contiguous group of transducer elements are beamformed in the beamformer 12 by appropriately delaying them and then combining them. Analog beamformers are known, but modern ultrasound systems perform beamforming in the digital domain by converting received echo signals to digital signal samples prior to beamformation. The partially beamformed signals produced by a microbeamformer are digitized and combined into fully beamformed coherent echo signals by the beamformer.

The coherent echo signals are coupled to a quadrature bandpass filter (QBP) 14. The QBP performs three functions: band limiting the RF echo signal data, producing in-phase and quadrature pairs (I and Q) of echo signal data, and decimating the digital sample rate. The QBP comprises two separate filters, one producing in-phase samples and the other producing quadrature samples, with each filter being formed by a plurality of multiplier-accumulators (MACs) implementing an FIR filter. The quadrature signal samples undergo signal processing by a signal processor 16, which includes filtering by a digital filter and speckle reduction as by spatial or frequency compounding. The signal processor can also shift the frequency band to a lower or baseband frequency range, as can the QBP. The digital filter of the signal processor 26 can be a filter of the type disclosed in U.S. Pat. No. 5,833,613 (Averkiou et al.), for example.

The beamformed and processed coherent echo signals are coupled to a detector 18. For B mode (tissue structure) imaging, the detector performs amplitude detection of the echo signals by processing the I, Q samples in accordance with the expression $(I^2+Q^2)^{1/2}$. For Doppler (flow and motion) imaging, the detector stores ensembles of echo signals from discrete points in an image field which are then used to estimate the Doppler shift at points in the image with a fast Fourier transform (FFT) processor. For a color Doppler image, the estimated Doppler flow values at each point in a blood vessel are wall filtered and converted to color values using a look-up table. B mode echo signals then undergo log compression in a log compressor 20 which converts their linearly disposed intensity values to logarithmically disposed intensity values by use of a look-up table. The echo signals, now in a form for use as pixels of an image, are stored in an image memory 22.

For B mode imaging in accordance with the present invention, this process is repeated twice, once to acquire and process echo signals from high frequency ultrasonic transmission and reception by the array transducer 112, then again to acquire and process echo signals from low frequency ultrasonic transmission and reception. This produces two sets of intensity values for pixels of an image, one for a high frequency image $I_{HF}$ and the other for a low frequency image $I_{LF}$. When the high frequency image is acquired by transmission and reception at ultrasonic frequencies which exceed the array pitch limitation discussed above, which causes the image to be susceptible to grating lobe artifacts, the high and low frequency image data is processed by a grating lobe suppressor 24 to suppress possible grating lobe artifacts as explained in conjunction with FIG. 3.

The grating lobe suppression can be applied before or after scan compression. It can also be applied before or after amplitude compression (log compression).

In certain aspects, the output of the grating lobe suppressor 24 is image data for a substantially artifact-free image. Both B mode image signals and the Doppler flow values are coupled to a scan converter 26 which converts the B mode and Doppler scanlines from their acquired R-θ coordinates to Cartesian (x,y) coordinates for display in a desired display format, e.g., a rectilinear display format or a sector display format. Either the B mode image or the Doppler image may be displayed alone, or the two shown together in anatomical registration in which the color Doppler overlay shows the blood flow in tissue and vessel structure in the B mode image. The ultrasound images produced by the scan converter 26 are coupled to a display processor 28 which produces signals suitable for producing a display of the ultrasound image on an image display 30.

The grating lobe suppressor 24 operates as follows. Two images, a low frequency image $I_{LF}$ and a high frequency image $I_{HF}$ are produced by the ultrasound system. $I_{LF}$ is acquired at a low imaging frequency and is free of grating lobes but shows poor spatial resolution. $I_{HF}$ is acquired at a high imaging frequency, has good spatial resolution, but may be contaminated by grating lobe artifacts. A multi-scale decomposition is performed on the two images. That is, the low frequency image is expressed as $I_{LF}=A_{LF}+D_{LF}$, where $A_{LF}$ is defined as $A_{LF}=\text{lowpass}(ILF)$, lowpass being a lowpass spatial filter, e.g., a Gaussian filter with a given kernel size. 'A' stands for the low-frequency 'approximation' of the original image, and 'D' stands for the high-frequency 'details' of the original image. A high frequency signal separator is used to produce $D_{LF}=I_{LF}-A_{LF}$ which contains the high frequency content of $I_{LF}$. Similar computation and frequency separation is used to produce $I_{HF}=A_{HF}+D_{HF}$.

A final image is reconstructed as $I_{FINAL}=A_{LF}+D_{HF}$. This final image is largely free of grating lobe artifacts, because the low spatial frequency grating lobe artifacts are in $A_{HF}$, the low spatial frequency component of the high frequency image. The final image shows good spatial resolution because the high-resolution objects are in $D_{HF}$, the details of the high-frequency image.

Figure 3:
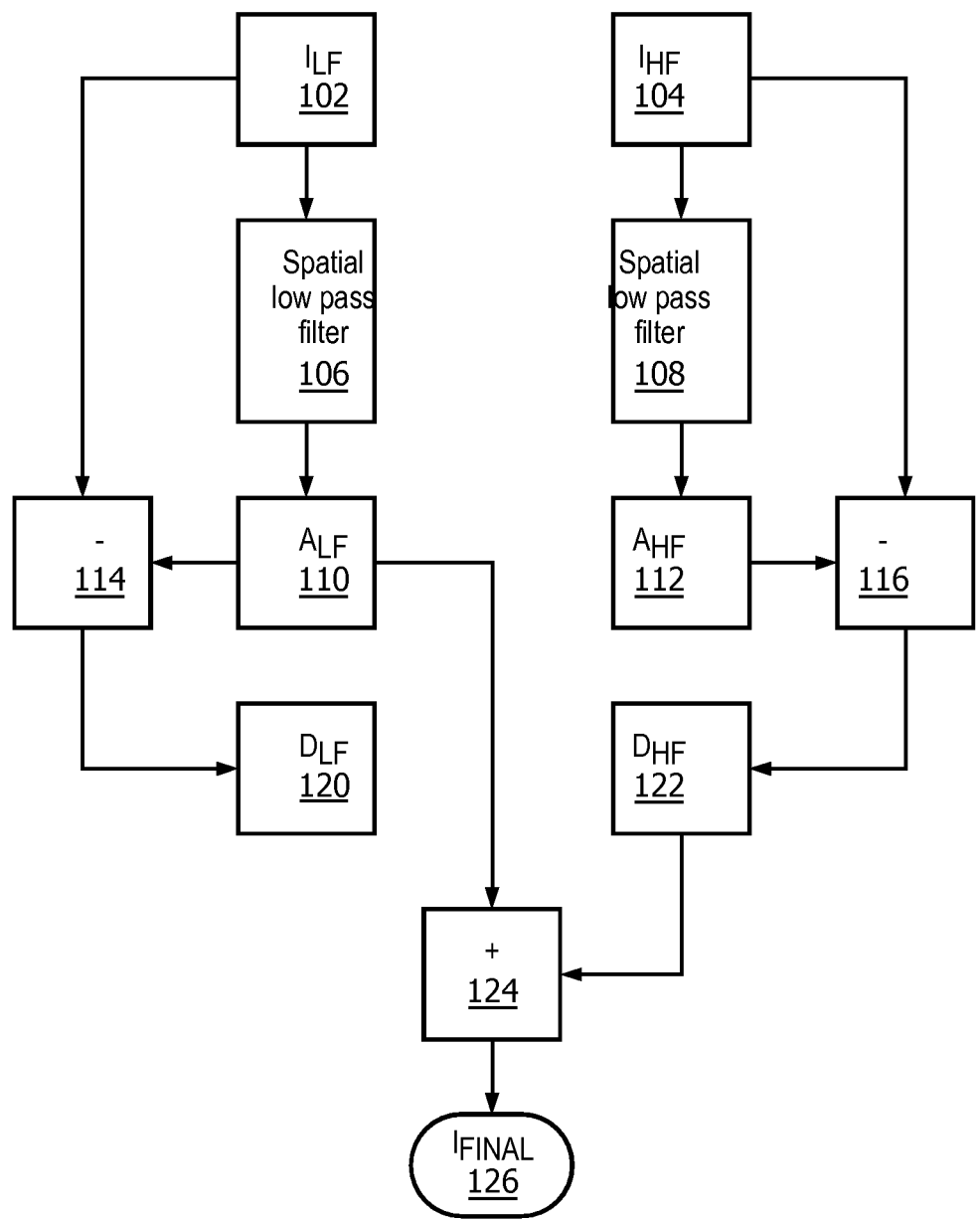
FIG. 3 is a block diagram illustrating the operation of the grating lobe suppressor of the ultrasound system of FIG. 2.

This processing of the low and high frequency images is explained in detail in FIG. 3, which begins with a low frequency image $I_{LF}$ 102 and a high frequency image $I_{HF}$ 104. Each image is filtered by a spatial low pass filter 106 or 108, which may be separate filters or a time-multiplexed single filter, to produce $A_{LF}$ 110 and $A_{HF}$ 112, respectively. The spatial low pass filter may take various forms. One form is a Gaussian spatial filter of a desired kernel size. For example suppose the kernel size is nine, a 3 by 3 matrix of image pixel values, the center one of which is weighted by two and the surrounding ones of which are weighted by one. Other kernel sizes such as 5×5 or 9×9 may also be used. An isotropic Gaussian filter is of the form $$G(x, y) = \frac{1}{2\pi\sigma^2} e^{-\frac{x^2+y^2}{2\sigma^2}}$$

where σ is a chosen standard deviation and x and y are pixel locations in a two-dimensional image.

The lowpass filtered images $A_{LF}$ and $A_{HF}$ are two scaled images of two multi-scaled images, the others being $D_{LF}$ and $D_{HF}$, which contain the high frequency detail of the two starting images. After calculating the low frequency content images $A_{LF}$ and $A_{HF}$, the simplest way to calculate the two high frequency content images are to subtract each low frequency image from its starting, full-band image, that is, $$D_{LF}=I_{LF}-A_{LF} \text{ and}$$

$$D_{HF}=I_{HF}-A_{HF}$$

These calculations are performed by subtractors at 114 and 116, respectively, producing $D_{LF}$ at 120 and $D_{HF}$ at 122. The final image $I_{FINAL}$ is produced at 126 by combining $A_{LF}$ and $D_{HF}$ with a combiner such as an adder at 124. The process is repeated on a pixel-by-pixel or voxel-by-voxel basis over the full image region. The final image $I_{FINAL}$ is free of grating lobe artifacts because $A_{HF}$ has been removed, whereas the high frequency detail is preserved by $D_{HF}$ and the low frequency content is contained in $A_{LF}$.

It has been found that nonlinear processing by selecting the final image pixel value in accordance with $I_{final}=\min(I_{LF}, I_{HF})$ or $I_{final}=\min(A_{LF}, A_{HF})+D_{HF}$ (where min is a pixel-wise minimum) produces results that are as good or better than the results described above.

Other variations for obtaining the low and high frequency images may be employed. For instance, the two images may be acquired by interleaving transmit pulses for the low and high frequency images, which will minimize motion artifacts. Instead of acquiring two images by separate transmit-receive sequences for each image, a single image may be acquired and then divided into low ($I_{LF}$) and high ($I_{HF}$) frequency images by low and high pass filtering the received r.f. signals into two images of low and high frequency image components, respectively; or low frequency and broadband (to keep a good axial resolution). While the system of FIG. 2 is shown performing grating lobe artifact suppression on log compressed data, the suppression processing can be performed using data which has not been log compressed. Because of nonuniform transducer bandwidths, a step of normalization may be needed to keep $I_{LF}$ and $I_{HF}$ in the same intensity range. This can be done by spatially low-pass filtering each image and using these low pass approximations to develop a low spatial frequency intensity transformation map so that local intensities largely match. Spatial frequencies for this step are ideally much lower than the low-pass filter used to create the "A" frequency images. Instead of a Gaussian filter, other spatial filters may be employed such as a Laplacian filter, which will have the effect of negatively weighting pixels around the center and increasing the weighting of the next level of neighboring pixels.

It should be noted that an ultrasound system suitable for use in an implementation of the present invention, and in particular the component structure of the ultrasound system of FIG. 2, may be implemented in hardware, software or a combination thereof. The various embodiments and/or components of an ultrasound system, for example, the grating lobe suppressor, or components and controllers therein, also may be implemented as part of one or more computers or microprocessors. The computer or processor may include a computing device, an input device, a display unit and an interface, for example, for accessing the Internet. The computer or processor may include a microprocessor. The microprocessor may be connected to a communication bus, for example, to access a PACS system or the data network for importing high and low frequency images. The computer or processor may also include a memory. The memory devices such as the image memory 22 may include Random Access Memory (RAM) and Read Only Memory (ROM). The computer or processor further may include a storage device, which may be a hard disk drive or a removable storage drive such as a floppy disk drive, optical disk drive, solid-state thumb drive, and the like. The storage device may also be other similar means for loading computer programs or other instructions into the computer or processor.

As used herein, the term "computer" or "module" or "processor" or "workstation" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of these terms.

The computer or processor executes a set of instructions that are stored in one or more storage elements, in order to process input data. The storage elements may also store data or other information as desired or needed. The storage element may be in the form of an information source or a physical memory element within a processing machine.

The set of instructions of an ultrasound system including those controlling the acquisition, processing, and transmission of ultrasound images as described above may include various commands that instruct a computer or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs or modules such as a neural network model module, a program module within a larger program or a portion of a program module. The software also may include modular programming in the form of object-oriented programming. The processing of input data by the processing machine may be in response to operator commands, or in response to results of previous processing, or in response to a request made by another processing machine.

Furthermore, the limitations of the following claims are not written in means-plus-function format and are not intended to be interpreted based on 35 U.S.C. 112, sixth paragraph, unless and until such claim limitations expressly use the phrase "means for" followed by a statement of function devoid of further structure.

What is claimed is:

1. An ultrasonic diagnostic imaging system which suppresses grating lobe artifacts comprising:

an ultrasound array adapted to acquire ultrasonic echo signals such that the ultrasonic diagnostic imaging system is adapted to produce, using the ultrasonic echo signals, low frequency and high frequency ultrasound images;

a spatial low pass filter adapted to separate low spatial frequency content of each of the low frequency and high frequency ultrasound images;

a signal separator adapted to separate high frequency content of each of the low frequency and high frequency ultrasound images;

a combiner adapted to combine the low spatial frequency content of the low frequency ultrasound image and the high spatial frequency content of the high frequency ultrasound image; and a display adapted to display an ultrasound image of the combined low spatial frequency and high frequency content of the low and high frequency ultrasound images in which grating lobe artifacts are suppressed.

2. The ultrasonic diagnostic imaging system of claim 1, wherein the ultrasound array is adapted to acquire the low frequency ultrasound image in response to the transmission of low frequency ultrasound energy, and to acquire the high frequency ultrasound image in response to the transmission of high frequency ultrasound energy.

3. The ultrasonic diagnostic imaging system of claim 2, wherein the ultrasound array is adapted to acquire the low frequency ultrasound image and the high frequency ultrasound image by interleaved transmission of pulses of low and high frequency ultrasound energy.

4. The ultrasonic diagnostic imaging system of claim 1, wherein the ultrasound array is adapted to acquire broad band ultrasonic echo signals for the ultrasound image; and further comprising
a filter adapted to separate the broad band ultrasonic echo signals into signals for a low frequency ultrasound image and a high frequency ultrasound image.

5. The ultrasonic diagnostic imaging system of claim 1, wherein the spatial low pass filter further comprises a Gaussian filter of a given kernel size.

6. The ultrasonic diagnostic imaging system of claim 1, wherein the spatial low pass filter further comprises a filter of a given kernel size, wherein the given kernel size comprises a plurality of first pixels around a center pixel and a plurality of second pixels neighboring the plurality of first pixels, wherein the filter is adapted to provide a negative weight for the plurality of first pixels and an increased weight for the plurality of second pixels.

7. The ultrasonic diagnostic imaging system of claim 1, wherein the spatial low pass filter further comprises a pair of spatial low pass filters adapted to operate on the low frequency and high frequency ultrasound images, respectively.

8. The ultrasonic diagnostic imaging system of claim 1, wherein the signal separator further comprises a subtractor adapted to subtract the low spatial frequency content produced by the spatial low pass filter from the ultrasound image operated upon by the spatial low pass filter.

9. The ultrasonic diagnostic imaging system of claim 8, wherein the subtractor further comprises a pair of subtractors adapted to subtract the low spatial frequency content produced by a pair of spatial low pass filters from the ultrasound images operated upon by the spatial low pass filters.

10. The ultrasonic diagnostic imaging system of claim 1, wherein the combiner further comprises an adder adapted to combine the low spatial frequency content of the low frequency ultrasound image and the high spatial frequency content of the high frequency ultrasound image.

11. The ultrasonic diagnostic imaging system of claim 1, wherein the ultrasound array further comprises a plurality of transducer elements,
wherein the array is further adapted to acquire ultrasonic echo signals for the high frequency ultrasound image by transmitting ultrasound signals exhibiting a wavelength which is smaller than twice the pitch of the transducer elements.

12. The ultrasonic diagnostic imaging system of claim 11, wherein the ultrasound array is further adapted to acquire ultrasonic echo signals for the low frequency ultrasound image by transmitting ultrasound signals exhibiting a wavelength which is greater than or equal to twice the pitch of the transducer elements.

13. The ultrasonic diagnostic imaging system of claim 1, further comprising a log compressor having an input coupled to receive signals produced by the ultrasound array and an output coupled to the spatial low pass filter.

14. The ultrasonic diagnostic imaging system of claim 1, wherein the combiner is further adapted to select pixels for the displayed ultrasound image in accordance with the low spatial frequency content of the low and high frequency images which exhibits the minimal value.

15. The ultrasonic diagnostic imaging system of claim 1, wherein the combiner is further adapted to select pixels for the displayed ultrasound image in accordance with a pixel value of the low frequency and high frequency ultrasound images which exhibits the minimal value.

16. The ultrasonic diagnostic imaging system of claim 1, wherein the ultrasound array is adapted to acquire broad band ultrasonic echo signals for the ultrasound image; and further comprising
a filter adapted to separate the broad band ultrasonic echo signals into signals for a low frequency ultrasound image and a broadband ultrasound image.

\* \* \* \* \*